United States Patent
Stephenson et al.

(10) Patent No.: US 11,111,430 B2
(45) Date of Patent: Sep. 7, 2021

(54) METHANE HYDRATES IMPROVED HYDROSTATIC PRESSURE OF FOAM FRACTURING

(71) Applicant: HALLIBURTON ENERGY SERVICES, INC., Houston, TX (US)

(72) Inventors: Stanley V. Stephenson, Duncan, OK (US); Ronald G. Dusterhoft, Katy, TX (US); Shameem Siddiqui, Richmond, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 16/957,447

(22) PCT Filed: Feb. 5, 2018

(86) PCT No.: PCT/US2018/016795
§ 371 (c)(1),
(2) Date: Jun. 24, 2020

(87) PCT Pub. No.: WO2019/152052
PCT Pub. Date: Aug. 8, 2019

(65) Prior Publication Data
US 2021/0071068 A1    Mar. 11, 2021

(51) Int. Cl.
*E21B 43/26*    (2006.01)
*C09K 8/94*    (2006.01)
*C09K 8/86*    (2006.01)

(52) U.S. Cl.
CPC .................. *C09K 8/86* (2013.01); *C09K 8/94* (2013.01); *E21B 43/2605* (2020.05)

(58) Field of Classification Search
CPC ... C09K 8/86; C09K 8/90; C09K 8/92; C09K 8/94; C09K 8/905; C09K 8/62;
(Continued)

(56) References Cited

U.S. PATENT DOCUMENTS

| 4,635,727 A | 1/1987 | Anderson et al. |
| 5,536,893 A | 7/1996 | Gudmundsson |

(Continued)

OTHER PUBLICATIONS

International Search Report and Written Opinion issued in PCT Application No. PCT/US2018/016795 dated Nov. 14, 2018.

*Primary Examiner* — Angela M DiTrani Leff
(74) *Attorney, Agent, or Firm* — McAfee & Taft

(57) ABSTRACT

Gas hydrates are formed in treatment fluid in situ within the wellbore. Foaming of the treatment fluid can occur both during the introduction of the gas treatment fluid to form hydrates and downhole near the subterranean reservoir where the heat of the reservoir will cause the gas hydrates to revert back to a gaseous state. The method involves preparing a treatment fluid comprising an aqueous base fluid, and a viscosifying agent at the surface. This treatment fluid is then introduced into the wellbore. Also, at the surface, a liquefied natural gas is pressurized and then vaporized to produce a vaporized natural gas. The vaporized natural gas is introduced into the wellbore so as to mix with the treatment fluid also being introduced. The introduction is such that gas hydrates are formed from the natural gas in the treatment fluid in situ within the wellbore.

20 Claims, 3 Drawing Sheets

(58) Field of Classification Search
CPC ... C09K 8/66; C09K 8/68; C09K 8/70; C09K 8/703; E21B 43/26; E21B 43/2605; E21B 43/2607
See application file for complete search history.

(56) References Cited

U.S. PATENT DOCUMENTS

| | | | |
|---|---|---|---|
| 6,035,933 A | 3/2000 | Khalil et al. | |
| 6,298,671 B1 * | 10/2001 | Kennelley | F17C 1/002 |
| | | | 62/50.2 |
| 7,198,107 B2 | 4/2007 | Maguire | |
| 8,991,499 B2 * | 3/2015 | Nevison | C09K 8/62 |
| | | | 166/308.2 |
| 2012/0118566 A1 * | 5/2012 | Vandor | C09K 8/62 |
| | | | 166/280.1 |
| 2013/0220605 A1 * | 8/2013 | Vandor | C09K 8/62 |
| | | | 166/267 |
| 2013/0228330 A1 | 9/2013 | Loree et al. | |
| 2014/0262265 A1 * | 9/2014 | Hutchins | C09K 8/92 |
| | | | 166/280.2 |
| 2014/0262292 A1 * | 9/2014 | Joseph | E21B 43/26 |
| | | | 166/308.1 |
| 2018/0291719 A1 * | 10/2018 | Gupta | C09K 8/94 |

* cited by examiner

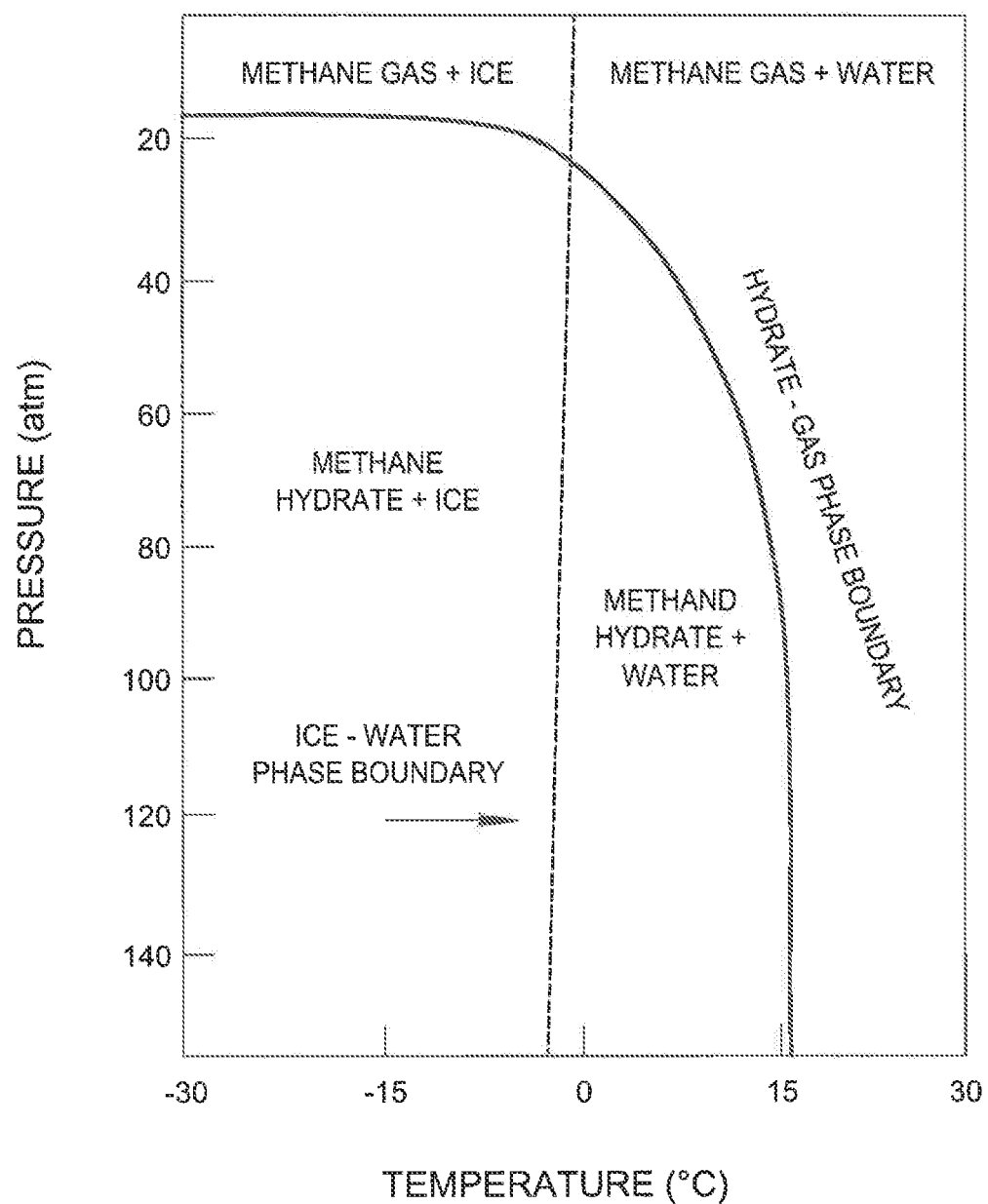
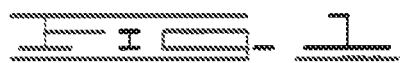

METHANE HYDRATES IMPROVED HYDROSTATIC PRESSURE OF FOAM FRACTURING

FIELD

The present invention relates generally to downhole operations for subterranean formations, more specifically, to hydraulic fracturing operations for subterranean formations, such as methods of enhancing fracturing fluid performance in such operations.

BACKGROUND

In order to efficiently produce hydrocarbons from a subterranean formation, the formation must be sufficiently conductive in order to allow the hydrocarbons to flow to the wellbore. Various treatments for increasing the conductivity of a subterranean formation have been developed.

One technique for increasing the conductivity of a subterranean formation and thereby stimulating production of hydrocarbons from the formation is hydraulic fracturing. Hydraulic fracturing generally involves pumping one or more treatment fluids into the formation at a sufficient hydraulic pressure to create or enhance one or more fractures in the formation. Typically, a pad fluid that does not contain any proppant particulates is first injected into the formation to initially fracture the formation. Following injection of the pad fluid, a proppant slurry that includes a plurality of proppant particulates is injected into the formation. The proppant slurry deposits the proppant particulates in the fracture and any branches thereof in order to prevent the fracture and the fracture branches from fully closing once the hydraulic pressure from the fluid is released and the fracturing operation is complete. The resulting "propped fracture" provides a conductive channel through which fluids in the formation can flow to the wellbore. As used herein and in the appended claims, the term "propped fracture" means a fracture (naturally-occurring or otherwise) in a subterranean formation that contains a plurality of proppant particulates.

Of particular interest in the oil and gas industry is new and/or improved methods of carrying out downhole operations such as fracturing operations.

BRIEF DESCRIPTION OF THE DRAWINGS

The drawings included with this application illustrate certain aspects of the embodiments described herein. However, the drawings should not be viewed as exclusive embodiments. The subject matter disclosed herein is capable of considerable modifications, alterations, combinations, and equivalents in form and function, as will be evident to those skilled in the art with the benefit of this disclosure.

FIG. 1 shows a phase diagram for the formation of methane gas hydrates.

DETAILED DESCRIPTION

Figure 2:
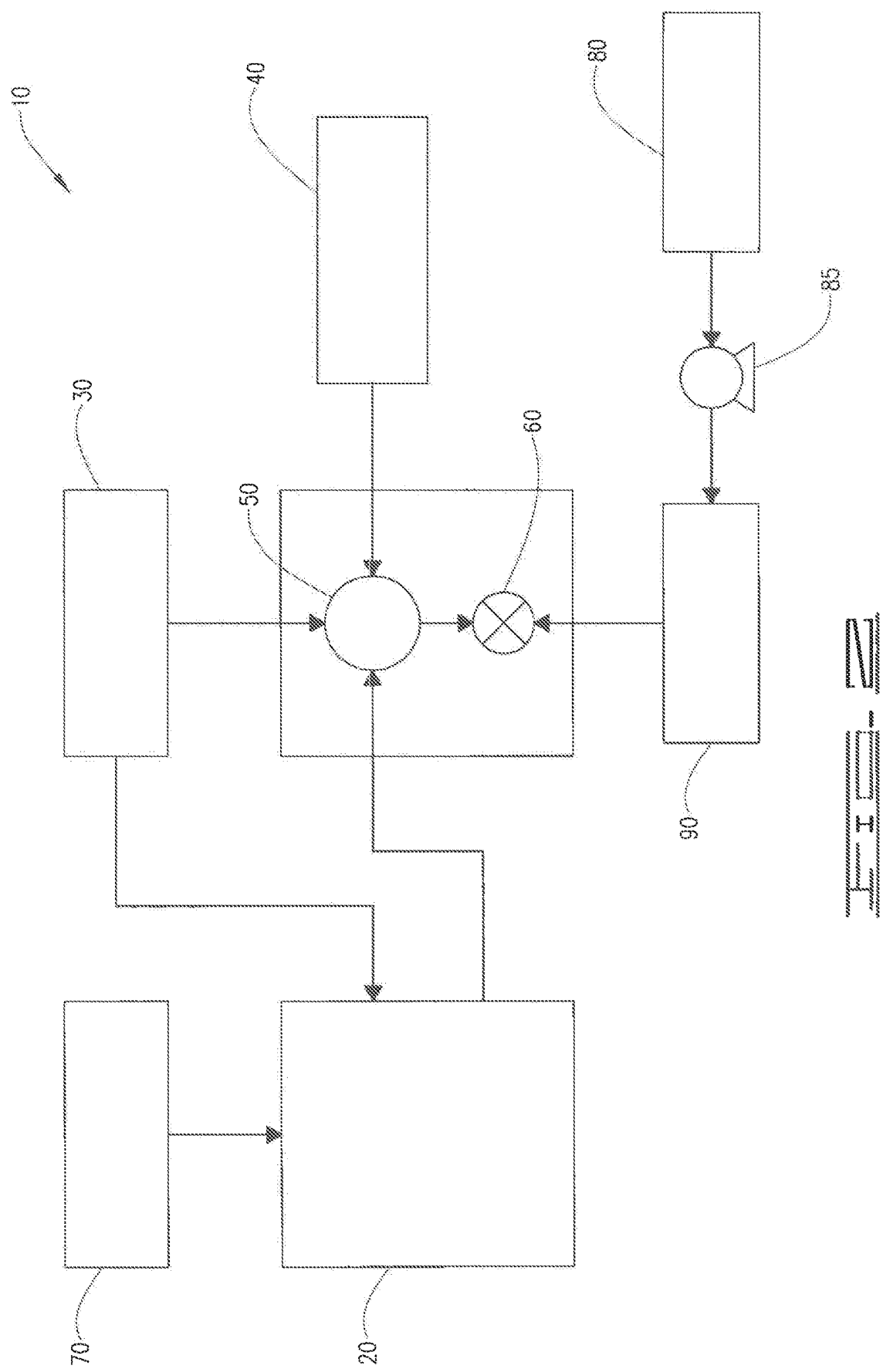
FIG. 2 is a diagram illustrating an example of a fracturing system that can be used in accordance with certain embodiments of the present disclosure.

The present disclosure may be understood more readily by reference to this detailed description, including the figures. For simplicity and clarity of illustration, where appropriate, reference numerals may be repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may have been exaggerated to better illustrate details and features of the present disclosure.

In accordance with this disclosure, systems, methods and well treatment fluids related to wellbores and subterranean formations are provided. Although specifically discussed in relation to fracturing subterranean formations, the systems, methods and well treatment fluids can be more generally used and adapted for other downhole operations, especially those using foamed treatment fluids.

Gases such as nitrogen and carbon dioxide have been used to foam treatment fluids in general and, more specifically fracturing fluids. Such foamed treatment fluids can be beneficial when a lower hydrostatic pressure in the wellbore is needed than would occur with more traditional liquid treatment fluids. Additionally, certain processes have introduced gas hydrates into the treatment fluids at the surface to create slurries and these slurries have been introduced downhole such that gas is released from the hydrates once the slurry is introduced into the subterranean reservoir. This gas then foams the treatment fluid once it is in the reservoir. However, for either of these processes, the lower hydrostatic pressure in the wellbore results in higher surface treating pressure that causes more damage to the pumps and in some cases the lower hydrostatic pressures with the associated higher treating pressures results in sufficiently high treating pressures that exceed the capabilities of the pumps.

Generally, these pressure requirements are the result of the relationship between surface pressure and pressure in the wellbore. For example, the surface pressure during a hydraulic fracturing treatment is governed by the following equation:

$$P\text{surface} = \text{BHTP} + \Delta P\text{friction} + \Delta P\text{perf} + \Delta P\text{net} - \Delta P\text{hydrostatic}$$

Where: BHTP=Bottomhole Treating Pressure (Frac Gradient×Depth), psi $\Delta P$friction=Treating pipe friction pressure (psi) injection rate, psi $\Delta P$perf=Friction pressure through perforations, psi $\Delta P$hydrostatic=Hydrostatic pressure, psi In the above formula, $\Delta P$net will be negligible early in the treatment as the distribution is being made across the perforated intervals as the individual fractures begin their early growth. The initial $\Delta P$hydrostatic will be calculated using density of the base fracturing fluid, hence why foamed treatment fluids (typically lower density than liquid treatment fluids) result in a lower hydrostatic pressure.

As will be realized from the above equation, the pressure necessary at the surface will increase as the hydrostatic pressure is reduced. In some formations, where higher hydrostatic pressure can be used, it is desirable to be able to use lower surface pressures and still obtain benefits from the use of foamed treatment fluids, such as improved proppant placement, more rapid cleanup, and in some cases, less damage from the treating fluid.

It has been found that the advantages of foam can be obtained while still retaining relatively higher hydrostatic pressures and lower surface treatment pressures by a process wherein gas hydrates are formed in the treatment fluid in situ within the wellbore. Foaming of the treatment fluid can occur both during the introduction of the gas to the treatment fluid prior to the formation of hydrates and downhole near the subterranean reservoir where the heat of the reservoir will cause the gas hydrates to revert back to a gaseous state.

Also, prior processes for introducing gas hydrates, requires utilizing compressed natural gas for forming a hydrate slurry at the surface. The compressed natural gas has been far upstream of the treatment fluid mixing process, and such compressed natural gas requires fluid storage with a pressure of 800 psi or more and also requires pumping systems that will handle 800 psi or more of suction on their pumps. Additionally, the compressed natural gas requires significant storage and pumping volumes because of its low density.

It has been additionally discovered, that the use of liquefied natural gas (LNG) can alleviate many of these issues, due to its higher density than compressed natural gas and lower storage and pumping pressure. Typically, LNG can be pumped and stored at near atmospheric pressures (about 0 psia to less than 100 psia, more typically 0 psia to about 50 psia or to about 20 psia) as opposed to the high (800 psia or more) pressures of compressed natural gas. Additionally, storage and pumping volumes are less for LNG due to its higher density.

Thus, the current method involves preparing a treatment fluid comprising an aqueous base fluid, and a viscosifying agent at the surface. This treatment fluid is then introduced into the wellbore. Also, at the surface, a liquefied natural gas is pressurized to a pressure at or above 100 atm and then vaporized within a vaporizer to produce a vaporized natural gas. The vaporized natural gas is introduced into the wellbore so as to mix with the treatment fluid also being introduced. The introduction is such that gas hydrates are formed from the natural gas in the treatment fluid in situ within the wellbore. Generally, this requires that the pressure within the wellbore is at least 100 atm and that the natural gas have a temperature within the wellbore of 15° C. or less.

The vaporized natural gas is initially in a gaseous state upon entering the wellbore, and converts to a gas hydrate upon contact with an aqueous treating fluid. This treatment fluid having gas hydrates is pumped down the wellbore to the site of the subterranean formation where treatment is desire, for example a location for fracturing of the formation. As the treatment fluid flows downhole heating will occur due to the tendency of temperature to rise with depth. This heating causes the disassociation of the gas hydrates to foam the treatment fluid; that is, natural gas is released from the gas hydrates and causes further foaming of the treatment fluid. While the foaming can be within the subterranean formation, generally, it will occur within the wellbore such that the treatment fluid is introduced in the subterranean formation fully foamed through the perforations in the wellbore. For fracturing operations, the treatment fluid will be introduced into the formation at a pressure sufficient to fracture the formation.

The "liquefied natural gas" or "LNG" of this disclosure is a natural gas that has been processed to remove impurities (for example, nitrogen, water and/or heavier hydrocarbons) and then condensed into a liquid at or near atmospheric pressure by cooling and depressurization. The term "natural gas" generally refers to a multi-component gas obtained from a crude oil well or from a subterranean gas-bearing formation. The composition of the natural gas can vary. A typical natural gas stream contains methane ($CH_4$) as a primary component. Raw natural gas will also typically contain ethylene ($C_2H_4$), ethane ($C_2H_6$), other hydrocarbons, and one or more acid gases (such as carbon dioxide, hydrogen sulfide, carbonyl sulfide, carbon disulfide and mercaptans), and minor amounts of contaminants such as water, nitrogen, iron sulfide, wax and crude oil. As mentioned above, the natural gas of this disclosure has been processed to remove impurities contained in the raw natural gas.

Accordingly, the liquefied natural gas and resulting vaporized natural gas typically can consist of or consist essentially of methane; that is it will be free of non-methane impurities or will only have trace amounts of impurities that will not significantly affect the process. In other words, at introduction of the vaporized natural gas into the wellbore, the natural gas generally is free or essentially free of other hydrocarbons, carbon dioxide, nitrogen or other impurities, additives or compounds other than methane. However, in some embodiments, the natural gas introduced into the wellbore can contain light hydrocarbons, carbon dioxide, nitrogen, and/or other fluids which provide benefits to the method. Alternatively, these light hydrocarbons, carbon dioxide, nitrogen, and/or other fluids, which provide benefits to the method, can be introduced into the wellbore separately from the natural gas. Often if other fluids are present in the natural gas, or introduced into the wellbore separately from the natural gas, the natural gas will be a binary or tertiary fluid made of natural gas and one or two of the additional fluids. Typically, the methane will be the predominant component with methane making up at least 90% by volume, and more typically 98%, 99%, 99.5% or 99.9% by volume of the natural gas.

As used herein, gas hydrates (also referred to as "clathrates") are a weak composite made of a host compound that forms a basic framework and a guest compound that is held in the host framework by inter-molecular interaction, such as hydrogen bonding, Van der Waals forces, and the like. Hydrates may also be called host-guest complexes, inclusion compounds, and adducts. As used herein, "clathrate hydrate" and "gas hydrate" are interchangeable terms used to indicate a clathrate having a basic framework made from water as the host compound. A hydrate is a crystalline solid which looks like ice and forms when water molecules form a three-dimensional cage-like structure around a "hydrate-forming constituent."

Also generally, a "hydrate-forming constituent" refers to a compound or molecule in petroleum fluids, including natural gas, which forms hydrate at elevated pressures and/or reduced temperatures. Illustrative hydrate-forming constituents include, but are not limited to, hydrocarbons such as methane, ethane, propane, butane, neopentane, ethylene, propylene, isobutylene, cyclopropane, cyclobutane, cyclopentane, cyclohexane, and benzene, among others. Hydrate-forming constituents can also include non-hydrocarbons, such as oxygen, nitrogen, hydrogen sulfide, carbon dioxide, sulfur dioxide, and chlorine, among others. As indicated above, the current methods and systems, concern hydrates formed primarily by methane.

The gas hydrates resemble ice but remain solid at temperature and pressure conditions above the freezing point of water. They generally include about 80 to 85 mol % water and 15 to 20 mol % gas. The gas of the hydrates of this disclosure is predominantly methane, but can include smaller quantities of other light hydrocarbon gases, such as ethane, propane and butanes. These gas hydrates may vary in composition depending upon the conditions of the wellbore and subterranean formation.

The formation of gas hydrates is dependent upon pressure and temperature. FIG. 1 illustrates some of the pressure and temperature conditions for the formation of methane gas hydrates.

As shown in FIG. 1, the pressure is represented on the vertical axis and temperature is represented on the horizontal axis. The dashed line represents the ice-water phase boundary; that is, the dashed line is the transition boundary between ice phase and water phase. The solid line represents the hydrate-gas phase boundary; that is, the solid line is the transition boundary between methane hydrate and methane gas. The conditions to form methane hydrates occur below this solid line. At conditions above this line, methane hydrates typically do not form. Other gas hydrates besides methane will likely have similar phase diagrams.

The average methane clathrate hydrate composition is 1 mole of methane for 5.75 moles of water. The observed density is around 0.9 g/cm$^3$. For one mole of methane, which has a molar mass of about 16.04 g, we have 5.75 moles of water, with a molar mass of about 18.02 g, so together for each mole of methane the clathrate complex has a mass of 16.04 g+5.75×18.02 g=119.65 g. The fractional contribution of methane to the mass is then equal to 16.04 g/119.65 g=0.134. The density is around 0.9 g/cm$^3$, so one liter of methane clathrate has a mass of around 0.9 kg, and the mass of the methane contained therein is then about 0.134×0.9 kg=0.1206 kg. At a density as a gas of 0.717 kg/m$^3$ (at 0° C.), that means a volume of 0.1206/0.717 m$^3$–0.168 m$^3$=168 L. Furthermore, natural gas hydrate slurry can be deliberately formed by mixing natural gas and water at a pressure of about 80-1.00 bar and a temperature of 2-10° C., As mention above, in the current method and systems, the gas hydrates are formed in the wellbore by first converting liquid natural gas to a high pressure gas (at or above 100 atm) and then introducing the high pressure gas (or vaporized natural gas) into the wellbore to contact an aqueous based treatment fluids under suitable conditions to form natural gas hydrates in the treatment fluid. "Well" or "wellbore" refers to a hole in the subsurface made by drilling or insertion of a conduit into the subsurface. The terms are interchangeable when referring to an opening in the formation. A well may have a substantially circular cross section, or other cross-sectional shapes (for example, circles, ovals, squares, rectangles, triangles, slits, or other regular or irregular shapes). Wells may be cased, cased and cemented, or open-hole, and may be any type, including, but not limited to a producing well, an injection well, an experimental well, and an exploratory well, or the like. A well may be vertical, horizontal, or any angle between vertical and horizontal (a deviated well), for example a vertical well may comprise a non-vertical component.

The introduction of the vaporized natural gas into the treatment fluid typically foams the treatment fluid at the same time that gas hydrates are formed in the treatment fluid. The formation of gas hydrates in the treatment fluid effectively increases the density of the foamed treatment fluid and creates a higher hydrostatic pressure in the wellbore than can be achieved by foamed treatment fluid alone. Further, as the treatment fluid flows down the wellbore, it is subjected to increasing temperatures, which eventually release the natural gas from the hydrates. This causes foaming of the treatment fluid while maintaining the pressure necessary at the subterranean formation for fracturing or other well servicing operations.

The treatment fluids utilized generally comprise an aqueous base fluid and an additive that increases the viscosity of the treatment fluid over the base fluid alone ("viscosifier"). Suitable aqueous base fluids that may be used in the treatment fluids of the present invention may include fresh water, salt water, brine, formation brine, seawater, or any other aqueous fluid that, preferably, does not adversely interact with the other components used in accordance with this invention or with the subterranean formation. In some embodiments, the aqueous base fluid may be present in the treatment fluids of the present invention in an amount in the range from about 5% to 99.99% by volume of the treatment fluid.

Suitable viscosifiers for aqueous based fluids include water-soluble polymers. Such water-soluble polymer include guar gums, guar derivatives, cellulose-based derivatives, high-molecular weight polysaccharides composed of mannose and galactose sugars, xanthan and other natural polymers and their derivatives. Additionally, synthetic polymers, such as polyacrylamides and polyacrylates, can be used as the viscosifier. Guar derivatives, for example, include hydropropyl guar (HPG), carboxymethyl guar (CMG), carboxymethylhydropropyl guar (CMHPG) and hydroxyethylated guar (HEG). Cellulose derivatives, for example, include hydroxyethylcellulose (HEC), hydroxypropylcellulose (HPC), carboxymethyl cellulose (CMC) and carboxymethythydroxyethylcellulose (CMHEC).

The polymers used as viscosifiers can be linear polymer but, where higher viscosities are desired, the linear polymers can be crosslinked. Various crosslinking agents can be used in association with the above viscosifiers to achieve such higher viscosities, typically where reservoir conditions indicate that greater viscosities differences between the low-viscosity fluid and the high-viscosity fluid would be useful, as further described below. Crosslinking agents are known in the art and may, for example, be based on boron, titanium, zirconium or aluminum complexes and can be used to increase the effective molecular weight of the polymer to achieve such higher viscosities in the viscosified treatment fluid.

Typically, the concentration of viscosifier in the base fluid will depend on the desired viscosity. Often such concentrations are from about 5 lb per 1000 gallon of base fluid to about 100 lb per 1000 gallons of base fluid.

In certain embodiments, the treatment fluids of the present invention also may optionally comprise salts, pH control additives, surfactants, breakers, bactericides, crosslinkers, fluid loss control additives, stabilizers, chelants, scale inhibitors, paraffin inhibitors, asphaltene inhibitors, mutual solvents, solvents, corrosion inhibitors, hydrate inhibitors, clay stabilizers, salt substitutes (such as tetramethyl ammonium chloride), relative permeability modifiers (such as HPT-1™ chemical additive available from Halliburton Energy Services, Duncan, Okla.), sulfide scavengers, fibers, nanoparticles, consolidating agents (such as resins and/or tackifiers), combinations thereof, or the like.

In many embodiments, the treatment fluids will contain surfactants that aid in or promote the formation of hydrates under the conditions in the wellbore near the surface, i.e. the location in the wellbore where the vaporized natural gas and treatment fluid are introduced. For example, the treatment fluids can contain one or more of the surfactants selected from the group consisting of sodium dodecyl sulfate (SDS), cetyltrimethylammonium bromide (CTAB), dodecyl alcohol ethoxylates (AEO), alpha olefin sulfonate (AOS), methyl ester sulfonate (MES) and mixtures thereof.

Also, during some or all stages of the process, the treatment fluids can contain proppants as are known in the art. The proppant type can be sand, intermediate strength ceramic proppants (available from Carbo Ceramics, Norton Proppants, etc.), sintered bauxites and other materials known to the industry. Any of these base propping agents can further be coated with a resin (available from Santrol, a Division of Fairmount Industries, Borden Chemical, etc.) to potentially improve the clustering ability of the proppant. In addition, the proppant can be coated with resin or a proppant flowback control agent such as fibers, for instance, can be simultaneously pumped. By selecting proppants having a contrast in one of such properties such as density, size and concentrations, different settling rates will be achieved.

In the embodiments, the treatment fluids of the present invention will undergo foaming in the wellbore by the vaporized natural gas and/or natural gas released from the hydrates. Foamed fluids are liquids that comprise a gas, in this case natural gas, and as used herein refers to co-mingled fluids. Foamed fluids can reduce fluid loss to the subterranean formation, and/or to provide enhanced proppant suspension. In examples of such embodiments, the natural gas may be present in the foamed treatment fluid of the present invention in an amount in the range of from about 5% to about 98% by volume of the treatment fluid, and more preferably in the range of from about 20% to about 80%. The amount of natural gas to incorporate into the fluid may be affected by factors including the viscosity of the fluid and wellhead pressures involved in a particular application. Under the embodiments of this disclosure, the treatment fluid can have a surface pressure during the method of fracturing of 100 atm to 1360 atm.

Figure 3:
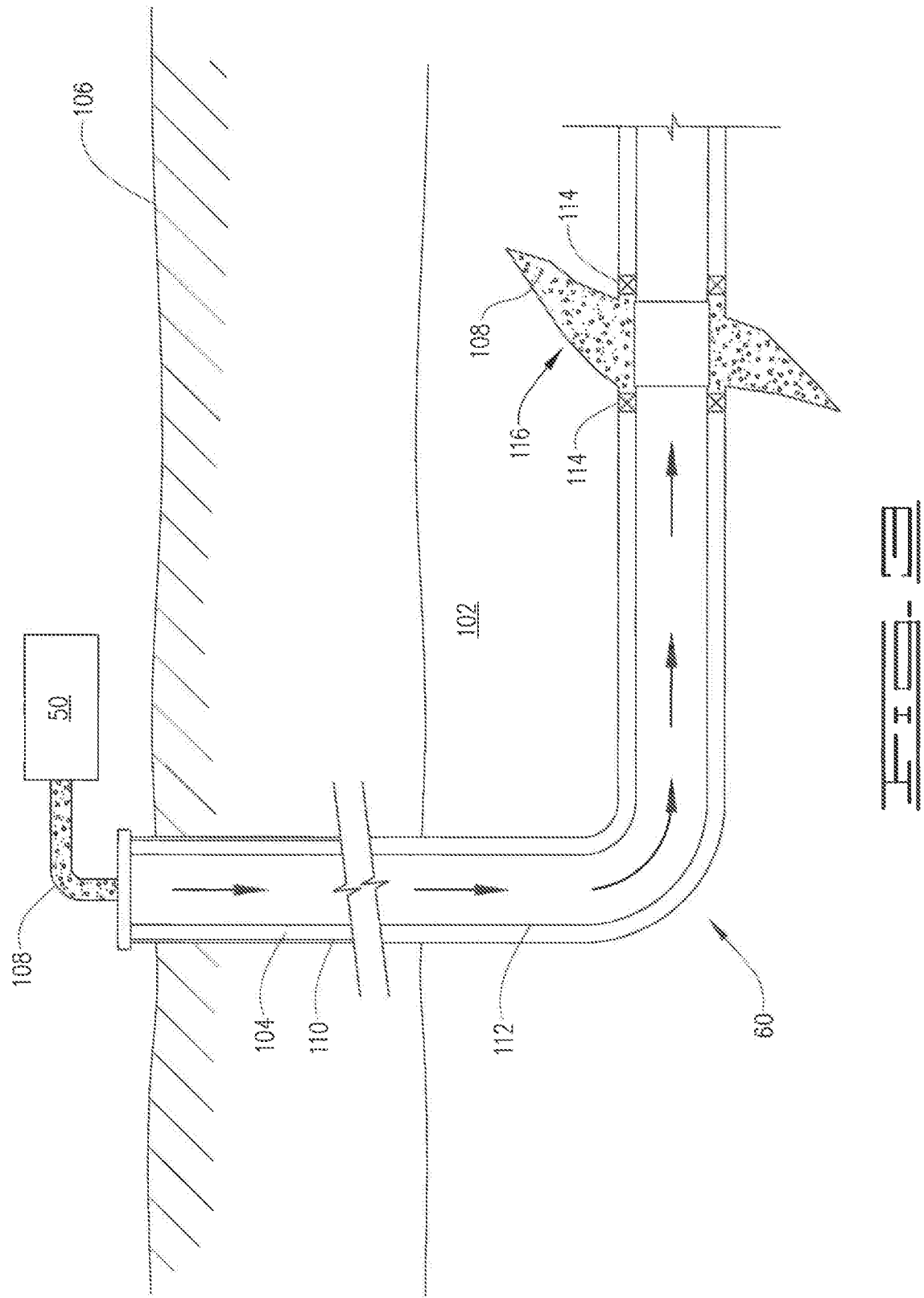
FIG. 3 is a diagram illustrating an example of a subterranean formation in which a fracturing operation can be performed in accordance with certain embodiments of the present disclosure.

The exemplary fluids, compositions and methods disclosed herein may directly or indirectly affect one or more components or pieces of equipment associated with the preparation, delivery, recapture, recycling, reuse, and/or disposal of the disclosed fluids, compositions and methods. FIGS. 2 and 3 illustrate a well treatment operation in accordance with this disclosure. The particular well treatment operation depicted is a fracturing operation; however, those skilled in the art will realize from this disclosure the application of the components of FIGS. 2 and 3 to other well treatment operations.

For example, and with reference to FIG. 2, an exemplary fracturing system 10 according to one or more embodiments is illustrated. In certain instances, the system 10 includes a fracturing fluid producing apparatus 20 (for example, for producing the pad fracturing fluid and the base fluid of the proppant slurry used in the disclosed method), a fluid source 30, a proppant source 40, and a pump and blender system 50. System 10 also can include a liquefied natural gas (LNG) source 80, an LNG pump system 85 and a vaporizer 90.

The system 10 resides at the surface at a well site where a well 60 is located. For example, the fracturing fluid producing apparatus 20 can combine a gel pre-cursor with an aqueous fluid (e.g., liquid or substantially liquid) from fluid source 30, to produce a hydrated fracturing fluid (for example, the pad fluid and/or the base fluid of the proppant slurry of the method disclosed herein) that is used to fracture the formation. The hydrated fracturing fluid can be a fluid for ready use in a fracture stimulation treatment of the well 60 or a concentrate to which additional aqueous fluid is added prior to use in a fracture stimulation of the well 60. In other instances, the fracturing fluid producing apparatus 20 can be omitted and the fracturing fluid sourced directly from the fluid source 30. In certain instances, as discussed above, the fracturing fluid may comprise water, a polymer gel and/or other fluids.

The proppant source 40 can include and provide the proppant (including the micro-proppant particulates and primary proppant particulates of the disclosed method) for combination with the fracturing fluid (for example, the pad fluid and proppant slurry) as appropriate. The system may also include an additive source 70 that provides one or more additives (e.g., gelling agents, weighting agents, and/or other optional additives as discussed above) to alter the properties of the fracturing fluid (for example, the pad fluid and/or proppant slurry). For example, the other additives 70 can be included to reduce pumping friction, to reduce or eliminate the fluid's reaction to the geological formation in which the well is formed, to operate as surfactants, and/or to serve other functions. As another example, the other additives 70 can include surfactants that will promote hydrate formation when the natural gas is introduced to the treatment fluid within the wellbore.

The pump and blender system 50 can receive the fracturing fluid (for example, the base carrier fluid) and combine it with other components, including proppant particulates from the proppant source 40 and/or additional fluid from the additives 70. The resulting treatment fluid mixture may be pumped into the well 60.

As the fracturing fluid mixture is being introduced into the well, LNG pump system 85 takes pump from LNG source 80 and introduces it to vaporizer 90. LNG source 80 is typically at or near atmospheric pressure and about $-161°$ C. or less in temperature. LNG pump system 85 increases the pressure of the LNG to ensure that the natural gas will be introduced into the well at or above 100 atm pressure. Within vaporizer 90, the LNG is vaporized into a gaseous state. LNG vaporizers are generally known in the art and generally are heat exchangers used for regasifying liquid natural gas, which are stored as a liquid under cryogenic temperatures. The heat exchanger provides heat to the LNG to cause the temperature to increase. Suitable vaporizers include steam heated, water heated, gas or diesel fired heated, etc., Vaporizer 90 can be any suitable vaporizer and can be either a nameless or flame type vaporizer. Essentially, LNG enters vaporizer 90 as a high-pressure liquid and exits as a high-pressure gas. The resulting vaporized natural gas is introduced into well 60. In some embodiments, the pressure of the vaporized natural gas is above 100 atm and the temperature of the vaporized natural gas is below the temperature necessary to form hydrates (typically about $15°$ C. or less) for introduction into well 60. In other embodiments, the liquid natural gas is vaporized at a temperature above that which hydrates will form in well 60. In these embodiments, the vaporized natural gas can be introduced through a pressure reducer, such as an orifice or a foaming nozzle, so that the vaporized natural gas undergoes a pressure reduction upon entering well 60. This pressure drop needs to be sufficient to cool the methane to at or below the temperature necessary to form hydrates in the treatment fluid in well 60.

As will be realized from the above, both the fracturing fluid mixture and vaporized natural gas are introduced simultaneously into well 60. Generally, during this introduction the vaporized natural gas will at least partially foam the fracturing fluid and will form methane hydrates within the fracturing fluid. Advantageously, the formation of hydrates results in a foam with a higher specific gravity (or density) than foams produced in the well without hydrates. For example, aqueous base fluid (not foamed) as a specific gravity of about 1 but when foamed the specific gravity is significantly lowered, for example to less than 0.5 and more typically less than 0.1. Hydrates typically have a specific gravity of about 0.9, thus, including them in a foamed fluid results in a higher specific gravity, which is closer to the aqueous base fluid or water.

The resulting foam-hydrate mixture may be pumped down the well 60 under a pressure sufficient to create or enhance one or more fractures in a subterranean zone, for example, to stimulate production of fluids from the zone. As the foam-hydrate mixture moves downhole, the temperature of the borehole increases; thus, hydrates convert back into a gaseous state so as to increase the foam quality of the treatment fluid within the reservoir. Generally, it is preferred that the majority (50% or more) of the conversion occurs at the portion of wellbore extending into the subterranean formation to be fractured. Typically, the conversion of hydrates to gas will be completed before the treatment fluid moves into formation. Thus, the resulting foamed treatment fluid without hydrates is introduced through perforations in the wellbore and into the subterranean formation at a pressure sufficient to fracture the formation.

Notably, in certain instances, the fracturing fluid producing apparatus 20, fluid source 30, proppant source 40, and/or LNG source may be equipped with one or more metering devices (not shown) to control the flow of fluids, proppant particulates, and/or other compositions. Such metering devices may permit the pumping and blender system 50 to source from one, some or all of the different sources at a given time, and may facilitate the preparation of fracturing fluids in accordance with the present disclosure using continuous mixing or "on the fly" methods. Thus, for example, the pumping and blender system 50 can provide just fracturing fluid (for example, the pad fluid) into the well at some times, just proppant slurry at some times, just proppant particulates at other times, and combinations of those components at yet other times.

FIG. 3 shows the well 60 during a fracturing operation in a portion of a subterranean formation of interest 102 (for example, a subterranean zone) surrounding a wellbore 104. For example, the formation of interest can include one or more subterranean formations or a portion of a subterranean formation.

The wellbore 104 extends from the surface 106, and the foamed fracturing fluid 108 (for example, the pad fluid and proppant slurry) is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shaped charges, a perforating gun, hydro jetting and/or other tools.

The well is shown with a work string 112 depending from the surface 106 into the wellbore 104. The pump and blender system 50 is coupled to a work string 112 to pump the fracturing fluid into the wellbore 104. Further, vaporizer 90 is coupled to work string 112 to introduce vaporized natural gas into the wellbore 104. The work string 112 may include coiled tubing, jointed pipe, and/or other structures that allow fluid to flow into the wellbore 104. The work string 112 can include flow control devices, bypass valves, ports, and or other tools or well devices that control a flow of fluid from the interior of the working string 112 into the subterranean zone 102. For example, the work string 112 may include ports adjacent the wellbore wall to communicate the fracturing fluid 108 directly into the subterranean formation. 102, and/or the work string 112 may include ports that are spaced apart from the wellbore wall to communicate the fracturing fluid 108 into an annulus in the wellbore between the work string 112 and the wellbore wall.

The work string 112 and/or the wellbore 104 may include one or more sets of packers 114 that seal the annulus between the work string 112 and wellbore 104 to define an interval of the wellbore 104 into which the fracturing fluid 108 will be pumped. FIG. 3 shows two packers 114, one defining an uphole boundary of the interval and one defining the downhole end of the interval.

When the fracturing fluid (for example, the pad fracturing fluid) is introduced into wellbore 104 (e.g., in FIG. 3, the area of the wellbore 104 between packers 114) at a sufficient hydraulic pressure, one or more primary fractures 116 and microfractures 118 are created in the subterranean zone 102. As shown, the microfractures have propagated from or near the ends and edges of the primary fractures 116. The primary proppant particulates in the fracturing fluid (for example, the proppant slurry) enter the fractures 116 where they may remain after the fracturing fluid flows out of the wellbore, as described above. These primary proppant particulates may "prop" fractures 116 such that fluids may flow more freely through the fractures 116. Similarly, the micro-proppant particulates in the fracturing fluid (for example, the pad fluid and the proppant slurry) enter the fractures 118 where they may remain after the fracturing fluid flows out of the wellbore, as described above. The primary proppant particulates and micro-proppant particulates "prop" fractures 116 and 118, respectively, such that fluids may flow more freely through the fractures 116 and 118.

While not specifically illustrated herein, the disclosed fluids, compositions and methods may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

The above disclosure is exemplified by a method of fracturing a subterranean formation, comprising:
   (a) preparing a treatment fluid comprising an aqueous base fluid, and a viscosifying agent, wherein the aqueous based fluid has a first density;
   (b) introducing the treatment fluid into a wellbore extending into a subterranean formation wherein the wellbore has perforations allowing fluid flow communication between the subterranean formation and the wellbore;
   (c) pressurizing and then vaporizing a liquefied natural gas;
   (d) introducing the thus vaporized natural gas into the treatment fluid such that gas hydrates are formed in the treatment fluid in situ within the wellbore;
   (e) introducing the treatment fluid containing the gas hydrates into a portion of the wellbore extending into the subterranean formation where the temperature and pressure of at the portion are sufficient to convert the gas hydrates into a gaseous state so as to foam the treatment fluid; and (f) introducing the thus foamed treatment fluid into the subterranean formation at a pressure sufficient to fracture the formation.

In the above method, the vaporized natural gas is generally at a pressure within the wellbore of at least 100 atm and a temperature within the wellbore of 15° C. or less during step (d). Also, the foamed treatment fluid typically will be formed in step (e) within the wellbore. If so, the foamed treatment fluid is introduced in the subterranean formation in step (f) through the perforations at a pressure sufficient to fracture the formation.

Another exemplary method is a method of treating a subterranean formation, comprising:

(a) preparing a treatment fluid comprising an aqueous base fluid, and a viscosifying agent, wherein the aqueous based fluid has a first density;

(b) introducing the treatment fluid into a wellbore extending into a subterranean formation;

(c) pressurizing and then vaporizing a liquefied natural gas;

(d) introducing the thus vaporized natural gas into the treatment fluid such that gas hydrates are formed in the treatment fluid in situ within the wellbore; and (e) introducing the treatment fluid containing the gas hydrates into a portion of the wellbore extending into the subterranean formation where the temperature and pressure of at the portion are sufficient to convert the gas hydrates into a gaseous state so as to foam the treatment fluid.

Similar to the method of fracturing, in this method the vaporized natural gas is generally at a pressure within the wellbore of at least 100 atm and a temperature within the wellbore of 15° C. or less during step (d).

In the above embodiments of the methods, the treatment fluid can have a surface pressure during the method of fracturing of from 100 atm to 1360 atm.

Typically, the above embodiments of the methods use a natural gas that consist of or consists essentially of methane. That is, at introduction of the vaporized natural gas into the wellbore, the natural gas is free or essentially free of other hydrocarbons, carbon dioxide, nitrogen or other additives or compounds other than methane. However, in some embodiments, the natural gas introduced into the wellbore can contains light hydrocarbons, carbon dioxide, nitrogen, and/or other fluids which provide benefits to the method. These light hydrocarbons, carbon dioxide, nitrogen, and/or other fluids, which provide benefits to the method, can be introduced into the wellbore separately from the natural gas. Often if other additives are present in the natural gas, or introduced into the wellbore separately from the natural gas, the natural gas will be a binary or tertiary fluid made of natural gas and one or two of the additives. Typically, the methane will be the predominant component with methane making up at least 90% by volume, and more typically 98%, 99% or 99.5% by volume of the natural gas.

Additionally, surfactants can be included to promote the formation of gas hydrates in the wellbore. While these may be added with the natural gas, typically they will be added with the treatment fluid. The surfactants can be selected from the group consisting of sodium dodecyl sulfate (SDS), cetyltrimethylammonium bromide (CTAB), dodecyl alcohol ethoxylates (AEO), alpha olefin sulfonate (AOS), methyl ester sulfonate (IVIES) and mixtures thereof.

Step (d) of the embodiments methods can comprise introducing the vaporized natural gas into the treatment fluid so that the treatment fluid is foamed by the introduction of the vaporized natural gas to produce a foamed treatment fluid and so that the vaporized natural gas forms gas hydrates with the aqueous base fluid, and wherein in step (e) foaming occurs by the conversion of the gas hydrates into a gaseous state. Generally, the foamed treatment fluid will have a second density when no hydrates are present and said second density is lower than the first density of the aqueous based fluid. In such cases, after formation of the hydrates, the foamed treatment fluid will have a third density which is greater than the second density.

Also, in the embodiments of the above methods, the treatment fluid can be introduced into the wellbore by a first pump and the liquefied natural gas can be introduced to a vaporizer by a second pump.

In the above embodiments of the methods, step (c) can be carried out in a vaporizer followed by a pressure reducer downstream of the vaporizer. In such embodiments, after vaporizing in the vaporizer, the pressurized liquefied natural gas is at a temperature above which hydrates would form and after exiting the pressure reducer the vaporized natural gas undergoes a pressure drop which cools the vaporized natural gas to a temperature at which hydrates can form within the treatment fluid in the wellbore.

Additionally, the above disclosure is exemplified by a system for treating and/or fracturing a subterranean formation. In certain instances, the system includes a treatment fluid producing apparatus, a fluid source, an additive source (for example a proppant source), and a pump and blender system. The system also includes a liquefied natural gas (LNG) source, a vaporizer and an LNG pump system.

For example, the treatment fluid producing apparatus can be suitable to combine a gel pre-cursor with an aqueous fluid from the fluid source, to produce a hydrated treatment fluid (for example, a pad fluid and/or proppant slurry for a fracturing operation) that is used to treat a subterranean formation. The pump and blender system can receive the treatment fluid (for example, the base carrier fluid) and combine it with other components, including proppant particulates from a proppant source and/or additional fluid from an additive source. The resulting mixture may be pumped down the wellbore, under a pressure.

The LNG pump system pumps fluid from the LNG source to the vaporizer in which a vaporized natural gas is produced. The pump system then pumps the vaporized natural gas into the wellbore to mix with treatment fluid and produce hydrates.

Therefore, the present compositions and methods are well adapted to attain the ends and advantages mentioned, as well as those that are inherent therein. The particular examples disclosed above are illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of fracturing a subterranean formation, comprising:
   (a) preparing a treatment fluid comprising an aqueous base fluid, and a viscosifying agent, wherein the treatment fluid has a first density;
   (b) introducing the treatment fluid into a wellbore extending into a subterranean formation wherein the wellbore has perforations allowing fluid flow communication between the subterranean formation and the wellbore;
   (c) pressurizing a liquefied natural gas and then vaporizing the thus pressurized liquefied natural gas;
   (d) introducing the thus vaporized natural gas into the treatment fluid so that the treatment fluid is foamed by the introduction of the vaporized natural gas and so that the vaporized natural gas forms gas hydrates with the aqueous base fluid in the treatment fluid in situ within the wellbore;
   (e) introducing the treatment fluid containing the gas hydrates into a portion of the wellbore extending into the subterranean formation where the temperature and pressure at the portion are sufficient to convert the gas hydrates into a gaseous state so as to further foam the treatment fluid by the conversion of the gas hydrates into a gaseous state; and
   (f) introducing the thus foamed treatment fluid into the subterranean formation at a pressure sufficient to fracture the formation.

2. The method of claim 1, wherein in step (d) the vaporized natural gas is at a pressure within the wellbore of at least 100 atm and a temperature within the wellbore of 15° C. or less.

3. The method of claim 1, wherein the foamed treatment fluid is formed in step (e) within the wellbore, and step (f) comprises introducing the thus foamed treatment fluid through the perforations into the subterranean formation at a pressure sufficient to fracture the formation.

4. The method of claim 1, wherein the treatment fluid has a surface pressure during the method of fracturing of from 100 atm to 1360 atm.

5. The method of claim 1, wherein the vaporized natural gas introduced into the wellbore contains light hydrocarbons, carbon dioxide, and nitrogen, wherein said light hydrocarbons consist of one or more of ethane, propane or butanes.

6. The method of claim 1, wherein the vaporized natural gas consists essentially of methane.

7. The method of claim 1, further comprising introducing surfactants to promote the formation of gas hydrates in the wellbore.

8. The method of claim 7, wherein the surfactants are selected from the group consisting of sodium dodecyl sulfate (SDS), cetyltrimethylammonium bromide (CTAB), dodecyl alcohol ethoxylates (AEO), alpha olefin sulfonate (AOS), methyl ester sulfonate (MES) and mixtures thereof.

9. The method of claim 8, wherein the vaporized natural gas consists essentially of methane.

10. The method of claim 1, wherein the treatment fluid foamed by the introduction of the vaporized natural gas has a second density when no hydrates are present and said second density is lower than the first density, and wherein after formation of the hydrates, the foamed treatment fluid has a third density which is greater than the second density.

11. The method of claim 1, wherein the treatment fluid is introduced into the wellbore by a first pump and the liquefied natural gas is introduced to a vaporizer by a second pump.

12. The method of claim 1, wherein step (c) is carried out in a vaporizer followed by a pressure reducer downstream of the vaporizer, and wherein after vaporizing in the vaporizer, the pressurized liquefied natural gas is at a temperature above which hydrates would form and after exiting the pressure reducer the vaporized natural gas undergoes a pressure drop which cools the vaporized natural gas to a temperature at which hydrates can form within the treatment fluid in the wellbore.

13. The method of claim 1, wherein:
   the treatment fluid includes surfactants to promote the formation of gas hydrates in the wellbore and the surfactants are selected from the group consisting of sodium dodecyl sulfate (SDS), cetyltrimethylammonium bromide (CTAB), dodecyl alcohol ethoxylates (AEO), alpha olefin sulfonate (AOS), methyl ester sulfonate (MES), and mixtures thereof;
   the treatment fluid has a surface pressure during the method of fracturing of less from 100 atm to 1360 atm and in step (d) the vaporized natural gas is at a pressure with the wellbore of at least 100 atm and a temperature within the wellbore of 15° C. or less;
   step (d) comprises introducing the vaporized natural gas into the treatment fluid so that the treatment fluid is foamed by the introduction of the vaporized natural gas to produce a foamed treatment fluid having a second density when no hydrates are present, which second density is lower than the first density, and where such introduction is such that the vaporized natural gas forms gas hydrates with the aqueous base fluid such that, after the formation of hydrates, the foamed treatment fluid has a third density which is greater than the second density, and wherein in step (e) further foaming occurs by the conversion of the gas hydrates into a gaseous state; and
   step (f) comprises introducing the foamed treatment fluid resulting from step (e) through the perforations into the subterranean formation at a pressure sufficient to fracture the formation.

14. A method of treating a subterranean formation, comprising:
   (a) preparing a treatment fluid comprising an aqueous base fluid, and a viscosifying agent, wherein the treatment fluid has a first density;
   (b) introducing the treatment fluid into a wellbore extending into a subterranean formation;
   (c) pressurizing a liquefied natural gas and then vaporizing the thus pressurized liquefied natural gas;
   (d) introducing the thus vaporized natural gas into the treatment fluid so that the treatment fluid is foamed by the introduction of the vaporized natural gas and so that the vaporized natural gas forms gas hydrates with the aqueous base fluid in the treatment fluid in situ within the wellbore; and
   (e) introducing the treatment fluid containing the gas hydrates into a portion of the wellbore extending into the subterranean formation where the temperature and pressure at the portion are sufficient to convert the gas hydrates into a gaseous state so as to further foam the treatment fluid by the conversion of the gas hydrates into a gaseous state.

15. The method of claim 14, wherein in step (d) the vaporized natural gas is at a pressure within the wellbore of at least 100 atm and a temperature within the wellbore of 15° C. or less.

16. The method of claim 14, wherein the treatment fluid has a surface pressure during the method of treating of from 100 atm to 1360 atm.

17. The method of claim 14, wherein the vaporized natural gas introduced into the wellbore contains light hydrocarbons, carbon dioxide, and nitrogen, wherein said light hydrocarbons consist of one or more of ethane, propane or butane.

18. The method of claim 14, wherein the vaporized natural gas consists essentially of methane.

19. The method of claim 14, further comprising introducing surfactants to promote the formation of gas hydrates in the wellbore.

20. The method of claim 19, wherein the foamed treatment fluid has a second density when no hydrates are present and said second density is lower than the first density, and wherein after formation of the hydrates, the foamed treatment fluid has a third density which is greater than the second density.

* * * * *

UNITED STATES PATENT AND TRADEMARK OFFICE
CERTIFICATE OF CORRECTION

PATENT NO. : 11,111,430 B2
APPLICATION NO. : 16/957447
DATED : September 7, 2021
INVENTOR(S) : Stanley V. Stephenson et al.

Page 1 of 1

It is certified that error appears in the above-identified patent and that said Letters Patent is hereby corrected as shown below:

In the Specification

Column 2, Line 51, add --@-- between "(psi)" and "injection"

Column 8, Line 41, delete the "," between "etc." and "Vaporizer"

Column 10, Line 6, delete the "." after "formation"

Column 11, Line 67, replace --(IVIES)-- with "(MES)"

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*